Feb. 23, 1926.
A. O. ABBOTT, JR
1,574,541
STOCK ROLLING APPARATUS
Filed June 15, 1921   2 Sheets-Sheet 1
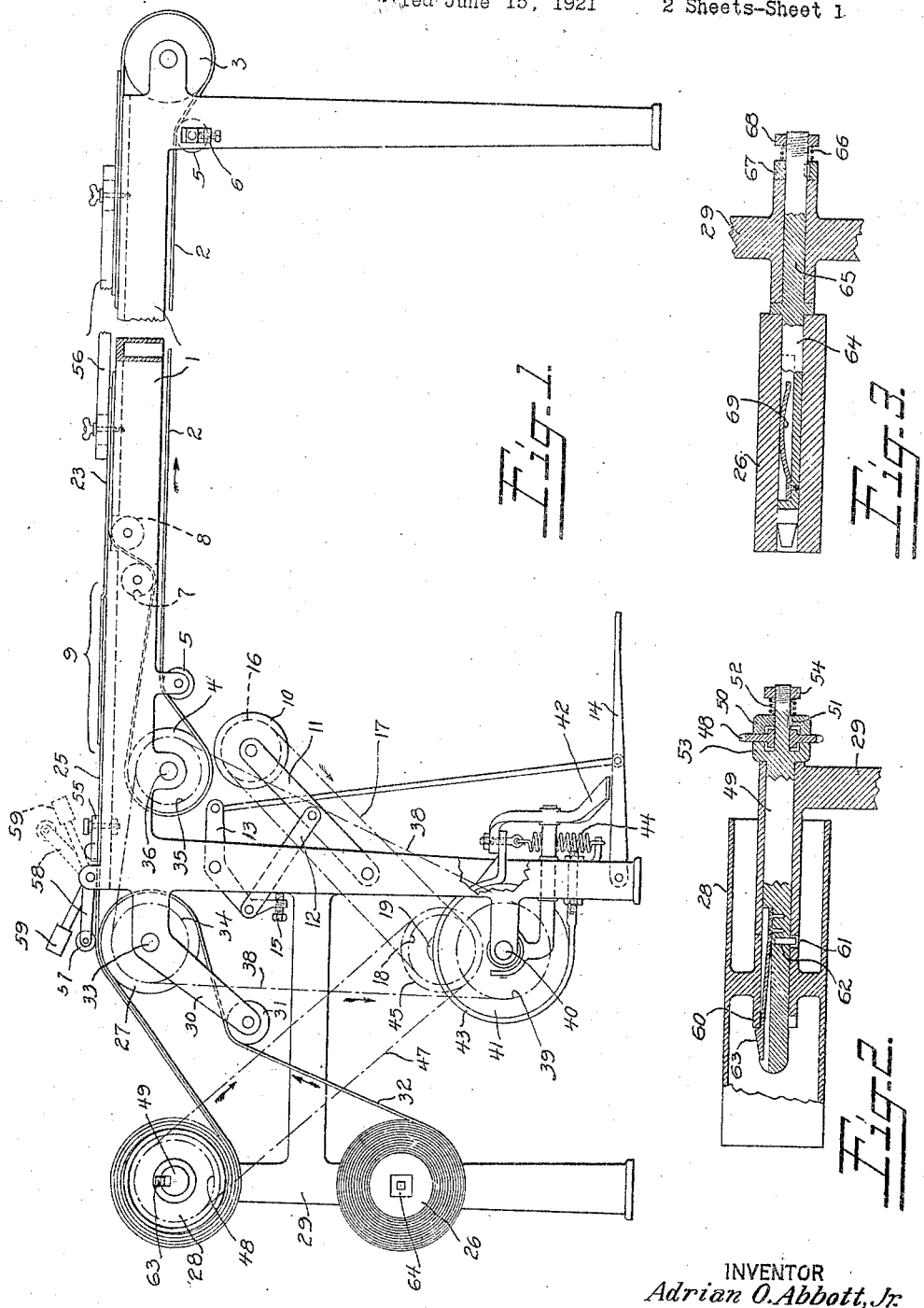
INVENTOR
Adrian O. Abbott, Jr.
BY
Ernest Hopkinson
HIS ATTORNEY

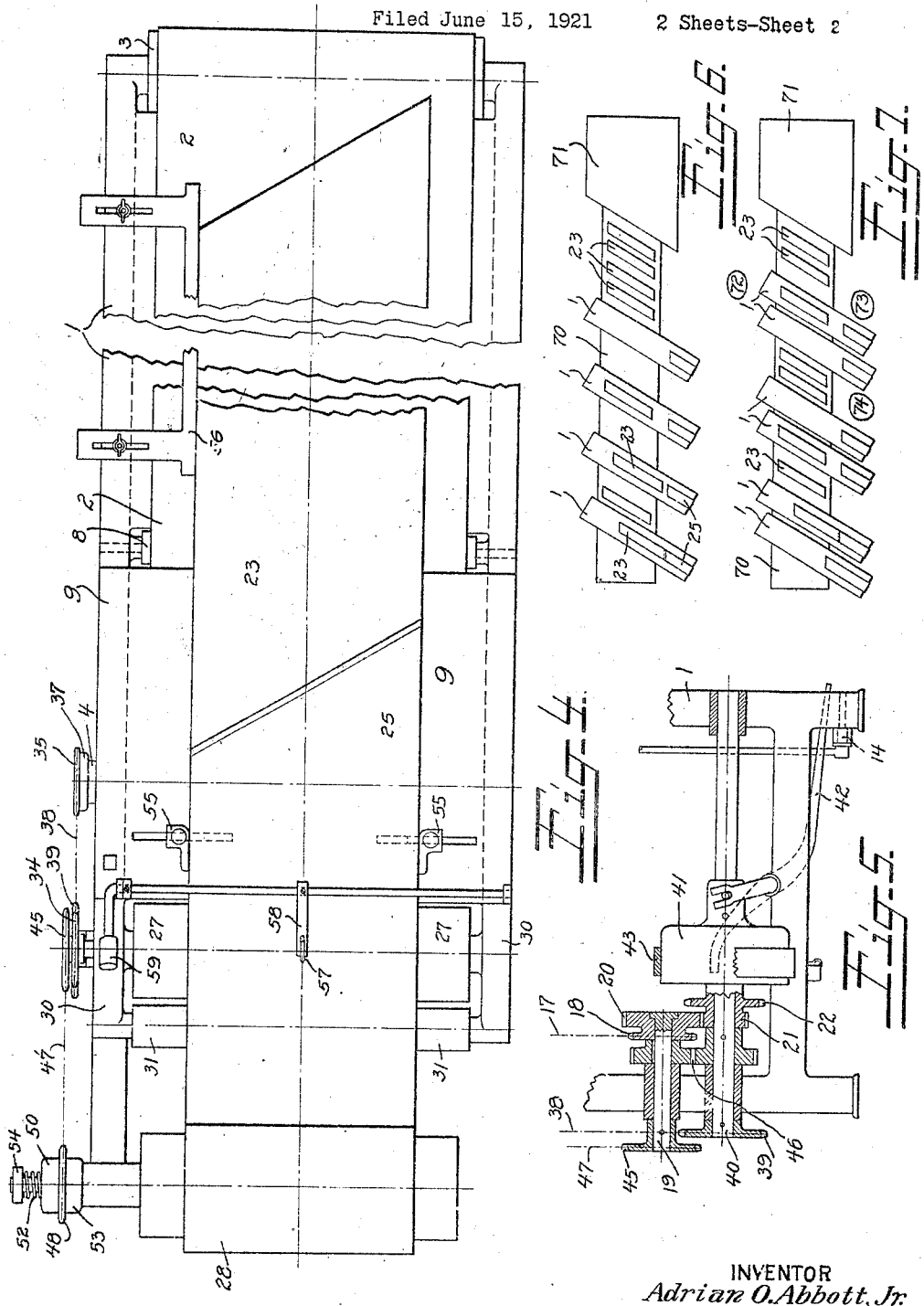

Patented Feb. 23, 1926.

1,574,541

UNITED STATES PATENT OFFICE.

ADRIAN O. ABBOTT, JR., OF DETROIT, MICHIGAN, ASSIGNOR TO MORGAN & WRIGHT, A CORPORATION OF MICHIGAN.

STOCK-ROLLING APPARATUS.

Application filed June 15, 1921. Serial No. 477,662.

*To all whom it may concern:*

Be it known that I, ADRIAN O. ABBOTT, Jr., a citizen of the United States, residing at Detroit, county of Wayne, and State of Michigan, have invented a certain new and useful Stock-Rolling Apparatus, of which the following is a full, clear, and exact description.

This invention relates to a stock rolling apparatus for splicing together lengths of adhesive stock and accumulating the same in a convenient condition for use by tire builders.

The plies of rubberized stock that are incorporated in tires are usually cut on a bias from a huge roll of fabric and, after their ends have been spliced together, rolled up between convolutions of a liner (a length of bare fabric) which prevents their tacky faces from adhering together. Heretofore, it has been the practice to grasp the end of a cut strip, pull it along over a table and lap or splice it onto the end of the previous strip and thus join them together to form a continuous length of stock. In consequence of the friction between the table and the rubberized surface of the stock, stretching occurred and the stock was drawn down or narrowed in width to an objectionable extent. Such narrowing in width rendered the strips unsuitable for the size of tire for which intended and wasteful trimming was necessary to reduce the narrowed strip to a width suitable for a smaller sized tire. Such waste, individually small, is large in the aggregate in a factory whose daily tire output runs up into the thousands.

The present invention aims to provide an apparatus for preserving the shape of the stock as cut to the exact width wanted, for minimizing or eliminating wasteful trimming, and for facilitating the stock manipulating operations between the cutting machine and the tire builders.

Without intention to limit the scope of the invention but having in mind the preferred illustrated embodiment thereof, it may be described as consisting of a conveyor system for delivering the strips of stock from a bias cutting machine to a polished table of short length where the ends may be spliced, and for rolling up the stock with a liner interposed between convolutions, the construction and arrangement being such that stretching of the stock is eliminated or substantially avoided.

A preferred embodiment of the invention is illustrated in the accompanying drawings in which:—

Fig. 1 is a side elevation of a suitable form of stock rolling table,

Figs. 2 and 3 are sections of a demountable winding-up reel and a liner supply-roll, respectively, Fig. 4 is a plan view of the rolling table shown in Fig. 1, Fig. 5 is a front elevation, partly in section, of the main driving mechanism, and Figs. 6 and 7 illustrate diagrammatically advantageous arrangements of a number of stock rolling tables relative a bias cutting machine and its conveyor.

In the preferred form of the invention illustrated, the table 1 is shown equipped with an endless belt form of conveyor 2 which passes around rolls 3 and 4, the latter of which is adapted to be driven by two different sets of mechanism. Take-up rolls 5 are provided to bear against the lower flight of the conveyor, one of these at least being adjustably supported as indicated at 6. The upper flight or run of the conveyor 2 passes between two spaced deflecting rolls 7 and 8 which are located intermediate of the length of the table so that the upper run or flight of the conveyor may be passed down beneath its surface as indicated and thereby leave clear and accessible for splicing purposes the relatively short length of surface indicated at 9, which is preferably polished smooth.

The conveyor belt 2 is adapted to be driven, at will, by bringing into contact therewith a friction driving roller 10, which is carried by pivoted arms 11 and adapted to be shifted by the link 12 and bell-crank-lever 13, the latter being linked to a treadle 14 and having a stop-screw 15 which is adapted to abut against a portion of the table frame and limit drop of the roller 10. The friction driving roller 10 is fixedly connected with a sprocket 16 chained as indicated at 17 to another sprocket 18 which is loosely mounted on a shaft 19 (see Fig. 5) preferably integral with a gear 20 adapted to mesh with a gear 21 that is constantly driven in any suitable manner as through the sprocket 22 from a source of power. As the roller 10 is continuously driven through the connections described, and as it normally occupies the position shown in Fig. 1, spaced from the conveyor roll 4, it will be obvious that, at will, an operative may, by merely depressing the treadle 14, move a strip of stock, indicated at 23, up to the position shown in Fig. 1 where its front end may be conveniently lapped and pressed onto the rear end of a preceding piece of stock indicated at 25.

Located in approximately the vertical plane of movement of the endless conveyor 2 are a liner-supply-roll 26, a liner-feed-roll 27, and an accumulating or wind-up reel 28, these being suitably journaled in a frame work or extension 29 of the table. Intermediate the liner-supply and feed-rolls 26 and 27, and on the supporting arm 30 of the later, is mounted a guide-roll 31. The liner 32 is passed over the guide roll 31, under and about the liner-feed-roll 27, and thence to the accumulating or wind-up reel 28.

One of the main objects of the present invention is to manipulate the stock without stretching it. This may be done variously. It is preferably accomplished by driving the wind-up reel 28, the liner-feed-roll 27 and the conveyor 2, so that their peripheral velocities are the same. And in the preferred construction shown, this is accomplished by providing a set of driving connections for each of the three elements named, which may be governed by a single controlling lever and which are operable independently of the previously mentioned conveyor drive and starting treadle 14 thereof.

On the shaft 33 of the liner-feed-roll is fixed a sprocket 34, and a sprocket 35 is loosely mounted on to the shaft 36 of the conveyor roll 4. Between the sprocket 35 and the roll 4 is interposed a suitable type of friction clutch or ratchet, indicated conventionally at 37 in Fig. 4, which will permit rotation of the roll 4 independently of the sprocket 35 in one direction but not in the other. A chain 38 is passed around the sprockets 34 and 35, and also around a third sprocket 39, which latter is fixed to a shaft 40, Fig. 5, loosely supporting the continuously operated gear and sprockets 21 and 22. The sprocket 22 is fixed to one part of a clutch 41, of any suitable well-known form, and the shaft 40 is fixed to the other and shiftable part of the clutch. This latter is adapted to be shifted by a foot lever 42 and its rotation to be stopped by a brake-band 43, which is normally applied by a coiled spring 44, the latter incidentally serving to normally hold the clutch parts separated and the shaft 40 idle.

On the shaft 19, Fig. 5, is fixed a sprocket 45 which is adapted to be driven from the shaft 40 through the intermeshing gears indicated at 46, both fixed to their respective shafts. A chain 47 encircles the sprocket 45 and a second sprocket 48, see Fig. 2, which is loose on the spindle 49 of the wind-up reel 28. A cupped-collar 50 is feathered at 51 to the spindle 49 and spring pressed as indicated at 52, so as to frictionally bind the web of the sprocket 48 between its face and the opposite flanged portion 53 of the spindle 49. For adjustment of the frictional driving engagement between the sprocket 48 and the spindle 49, a nut 54 is provided. Through the connections previously described in detail, the wind-up reel 28 may be driven, despite the accumulation of stock increasing its peripheral length, at a peripheral velocity always equal to that of the liner 32, whose peripheral velocity is determined by that of the liner-feed-roll 27 about which it is looped for a sufficient extent to that end.

By suitably proportioning the sprockets 34 and 35, and the rolls 27 and 4, the rate of travel of the liner strip 32 and of the conveyor belt 2 may be made exactly equal.

To facilitate winding the stock centrally on the wind-up reel 28, edge guides 55 and 56 may be adjustably secured to the table 1 by the usual slot and clamp connections shown.

For convenience in marking or scratching a center line on each sheet of the stock, an edged roller 57 is mounted on a bell-crank-lever 58 having a weighted end 59, the latter being adapted to hold it against the stock passing thereunder with the requisite pressure, or to hold it in the inoperative position shown in dotted lines in Fig. 1.

The wind-up reel and liner supply roll may be of any suitable type or construction. For convenience, it is preferred to make both demountable as shown in Figs. 2 and 3. Referring thereto, the wind-up reel 28 is shown with a short hub portion 60 which is provided with an open-ended slot 61 adapted to embrace a pin 62 which is fastened to the spindle 49, thereby insuring rotation of the shell portion of the reel when the spindle is frictionally driven. A latch 63 is provided to hold the reel to the spindle against accidental endwise displacement. The liner-supply-roll 26 is preferably slipped on a squared-end 64 of the spindle 65, which latter is rotatably supported in the frame work or table extension 29, too free rotation or coasting of the liner-supply-roll being prevented by a coiled spring 66 between a collar 67, which is feathered to the spindle, and a nut 68. Endwise shift or displacement of the liner-supply-roll 26 is prevented by a clipped friction spring shown at 69, the same being pocketed as shown in the squared-end 64 of the spindle.

Any suitable number of tables 1 may be employed where desired about the factory, but they are preferably arranged at an angle and immediately above and over the main conveyor 70, the latter being commonly employed in connection with a bias cutting machine indicated diagrammatically at 71 to carry the cut strips 23 away as fast as they are severed from the previously calendered roll of fabric. As shown in Figs. 6 and 7, respectively, these tables may be arranged either singly in spaced relation, or in pairs in spaced relation, the latter arrangement being preferred so that a helper, stationed at the point 72, may readily assist or serve two operatives at their stations 73 and 74.

In operation, the cut strips of stock 23 are lifted from the main conveyor 70, or such other agency as may be employed to bring them to the tables 1, and strip by strip are lifted and placed upon the conveyor 2, care being taken to align them properly for rolling by abutting their edges against the guides 56. The operator then depresses the treadle 14 so as to bring the friction drive-roller 10 into contact with the belt 2. Thereby, the strip of stock is advanced to the splicing surface 9 of the table. When its front end has been sufficiently projected upon the splicing surface, the operator releases the treadle and halts movement of the strip of stock. Then, if desired, the end of the stock is quickly lapped and pressed upon the rear edge of the previous strip of stock. When the splice has thus been completed, the operator depresses the treadle 42. This releases the brake-band 43 and immediately thereafter couples up the parts of the clutch 41 with the driving sprocket 22. Actuation of chains 38 and 47 ensues and thereby the stock, resting on the conveyor 2 and on the liner, is carried or moved at the same speed and wound up on the reel 28 without any substantial stretching or distortion from the shape in which it has been cut, it being understood that the splicing surface 9 of the table 1 is of relatively short length, materially shorter than the length of the strips of stock and having a smooth or polished surface which, it has been found, does not appreciably retard the movement of the rubberized stock and thereby cause it to stretch unduly.

The foregoing relates to the preferred form of the invention. It will be obvious that many changes and alterations may be made therein without departing from its underlying principles of operation. And reference should, therefore, be made to the accompanying claims for an understanding of the scope of the invention.

Having thus described my invention, what I claim and desire to protect by Letters Patent is:

1. In a stock rolling table, the combination with a conveyor of a length of liner, an accumulating reel, means for rotating the accumulating reel, and means for feeding the liner to the accumulating reel in the same direction as the conveyor advances stock, said means for rotating the accumulating reel including devices tending to impart thereto a peripheral speed in excess of the linear velocity of the liner but permitting slippage so as not to exceed the speed of the liner's travel whereby stock may be wound up on the reel without substantial stretching.

2. In an apparatus for winding up stock, a conveyor, a source of liner supply, a reel, said reel being disposed in alignment with said conveyor, a liner feed roll, means including a lost motion driving connection tending to rotate the reel at a peripheral velocity in excess of the liner feed-roll's, means for operating the liner feed-roll, and means for operating the conveyor independently of or in unison with the liner feed-roll.

3. In an apparatus for rolling up stock with a liner intermediate its convolutions, the combination with an endless conveyor operable at will of means in alignment with the conveyor and located in the vertical plane of its endless movement for rolling up stock and liner strips without substantially distorting the former.

4. In an apparatus for rolling up stock with a liner strip intermediate its convolutions, the combination with a conveyor operable at will of means for rolling up stock and a liner strip without substantially distorting the former, said means including a reel, a liner feed-roll, and means for rotating the same with substantially equal peripheral velocities as the stock and liner strips accumulate on the reel.

5. In an apparatus for rolling up stock with a liner strip intermediate its convolutions, the combination with an endless conveyor operable at will of means arranged in series with said conveyor for rolling up stock and a liner strip without substantially distorting the former, and means between the endless conveyor and the previously mentioned means permitting the ends of separate lengths of stock being spliced thereupon.

6. In an apparatus for rolling up and splicing strips of stock with a liner strip intermediate its convolutions, in combination, a table having a splicing surface shorter than the strips of stock, a conveyor for conducting the stock to the splicing surface of the table, a liner-supply-roll, a roll adjacent the splicing surface, a stock and liner reel, means for operating the stock and liner reel, and means for actuating the conveyor in unison with or independently of the reel.

7. In an apparatus for winding up and splicing stock, in combination, a table having a splicing surface of relatively short length, an endless conveyor arranged to move in a substantially vertical plane and having a flight or run terminating substantially flush with said splicing surface of the table, a liner supply roll, a liner feed-roll located adjacent the splicing surface of said table and opposite the conveyor, a reel for stock and the liner, means for operating the liner-feed-roll and the conveyor so as to move the liner strip and the conveyor at the same linear velocity, means for operating the reel at a variable angular velocity so as to wind up the liner strip and stock superimposed thereon at a speed not less than the peripheral velocity of the liner-feed-roll, and means for operating the conveyor independently of the liner-feed-roll.

8. In an apparatus for rolling up and splicing stock with a liner strip intermediate its convolutions, in combination, an endless conveyor, a splicing table to which the endless conveyor delivers stock, a liner-supply-roll, means for retarding free unwinding of the liner-supply-roll, a liner-feed-roll, a reel for winding up the stock and liner strips, said reel and rolls being disposed so that the liner strip contacts the liner-feed-roll for a sufficient length of its periphery to have its linear velocity determined thereby, means for operating the liner-feed-roll and conveyor so that the liner strip and the conveyor have substantially the same linear velocity, a friction drive for the reel tending to operate it with a peripheral velocity in excess of the liner-feed-roll's, and means for operating the conveyor independently of the liner-feed-roll.

9. In a stock rolling apparatus, in combination, a splicing table, means for conducting strips of stock thereto without stretching them, means for conducting stock therefrom after splicing ends of the strips together and for accumulating the stock on a roll with a liner strip interposed between convolutions, said last named means including liner, liner-feed and wind-up rolls, and means for operating the rolls in unison with the first mentioned means so as to move all the stock at the same linear velocity and without stretching it.

10. In an apparatus for rolling up stock, in combination, an endless conveyor, an accumulating reel, a source of liner supply, means for operating the accumulating reel and for feeding the liner strip thereto and for moving the conveyor all at the same rate of speed, and means for operating the conveyor independently of the last mentioned means.

11. In an apparatus for rolling up stock, in combination, an endless conveyor, an accumulator, a source of liner supply, means for moving the conveyor and the accumulator and feeding the liner to the accumulator all at an equal rate of speed, said last named means including a driving connection to the accumulator permitting slippage, and a frictional drive for the conveyor operable independently of the first mentioned means.

12. In a stock rolling apparatus, in combination, an accumulating reel, a liner-supply-roll, a liner-feed-roll, and means for operating the accumulating reel and liner-feed-roll at the same peripheral velocity.

13. A system for handling strips of stock and splicing and rolling them up comprising a main conveyor, a plurality of auxiliary endless conveyors arranged at an angle to and located immediately above the said main conveyor, and means associated with each of said auxiliary conveyors for permitting the strips of stock to be spliced together and wound up without substantially stretching them.

Signed at Detroit, Michigan, this 10th day of June, 1921.

ADRIAN O. ABBOTT, JR.